(12) United States Patent
Pirro et al.

(10) Patent No.: US 7,261,632 B2
(45) Date of Patent: Aug. 28, 2007

(54) SELF-PROPELLED HARVESTING MACHINE

(75) Inventors: Peter Pirro, Wallhaben (DE); Jürgen Hofer, Grossbundenbach (DE); Stefan Bohrer, St. Wendel (DE); Rainer Schäfer, Zweibrücken (DE); Steffen Clauss, Rieschweiler-Mühlbach (DE)

(73) Assignee: Deere & Company, Moline, IL (US)

( * ) Notice: Subject to any disclaimer, the term of this patent is extended or adjusted under 35 U.S.C. 154(b) by 211 days.

(21) Appl. No.: 11/156,515

(22) Filed: Jun. 20, 2005

(65) Prior Publication Data

US 2005/0279070 A1 Dec. 22, 2005

(30) Foreign Application Priority Data

Jun. 21, 2004 (DE) .................... 10 2004 029 954

(51) Int. Cl.
*A01D 75/18* (2006.01)
*A01F 12/16* (2006.01)
*A01F 21/00* (2006.01)

(52) U.S. Cl. ........................................ 460/6; 56/10.2 R

(58) Field of Classification Search ............. 56/10.2 R; 460/6, 116; 701/103, 106, 50; 123/352, 123/353; 340/684; 180/306, 307; 477/169, 477/111

See application file for complete search history.

(56) References Cited

U.S. PATENT DOCUMENTS

| | | | | |
|---|---|---|---|---|
| 3,515,144 A | * | 6/1970 | Charles | 460/4 |
| 4,542,802 A | * | 9/1985 | Garvey et al. | 180/306 |
| 4,934,985 A | * | 6/1990 | Strubbe | 460/4 |
| 5,878,557 A | * | 3/1999 | Wyffels et al. | 56/13.5 |
| 6,073,428 A | | 6/2000 | Diekhans | |
| 6,119,442 A | * | 9/2000 | Hale | 56/10.2 H |
| 6,148,784 A | * | 11/2000 | Masberg et al. | 123/192.1 |
| 6,247,295 B1 | * | 6/2001 | Hansen et al. | 56/10.2 A |
| 6,553,300 B2 | * | 4/2003 | Ma et al. | 701/50 |
| 2003/0126845 A1 | * | 7/2003 | Heisey | 56/10.2 G |
| 2005/0279070 A1 | * | 12/2005 | Pirro et al. | 56/14.6 |

FOREIGN PATENT DOCUMENTS

| | | |
|---|---|---|
| DE | 196 48 324 | 11/1996 |
| DE | 198 57 046 | 12/1998 |
| DE | 199 17 171 | 4/1999 |
| DE | 199 21 466 | 5/1999 |
| DE | 199 21 697 | 5/1999 |
| DE | 199 24 304 | 5/1999 |
| DE | 100 57 374 | 11/2000 |
| DE | 100 64 860 | 12/2000 |
| DE | 101 10 232 | 3/2001 |
| DE | 101 34 137 | 7/2001 |
| EP | 0 421 042 | 10/1989 |

\* cited by examiner

*Primary Examiner*—Arpád Fábián Kovács

(57) ABSTRACT

A self-propelled harvesting machine having an internal combustion engine, a propulsion system that can be operated to cause the harvesting machine to move across a field with a propulsion speed, a crop material pick-up device for picking up the crop material from a field, a crop material processing device for processing the crop material that has been picked up, a control unit for specifying the speed of the internal combustion engine, and a through-put measurement device for determining the through-put of the harvesting machine. The control unit can be operated to vary the speed of the internal combustion engine depending on the signal from the through-put measurement device. In this manner the RPM of the internal combustion engine that is most favorable in terms of fuel consumption and that corresponds to the power to be applied at a given through-put can be specified.

9 Claims, 2 Drawing Sheets

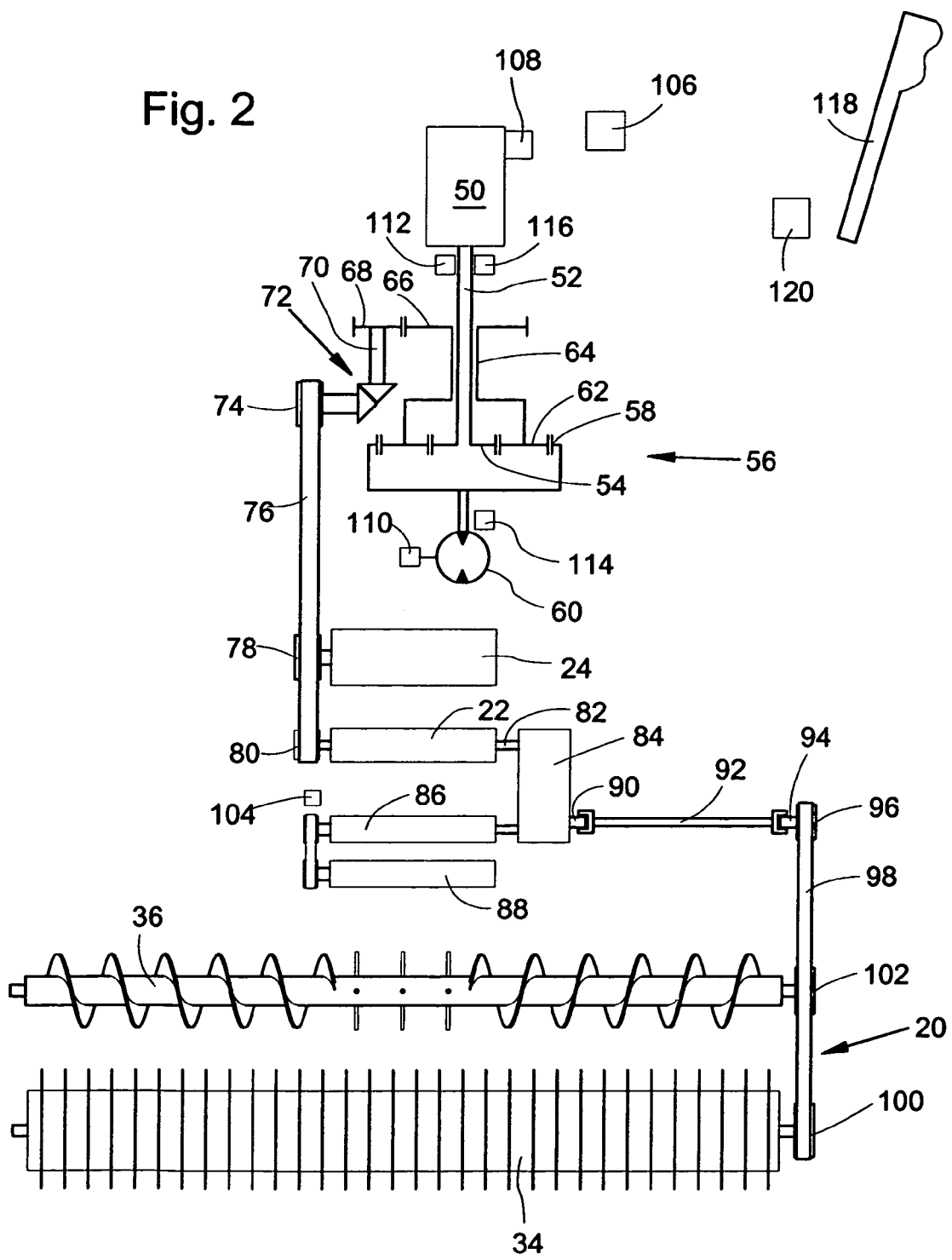

SELF-PROPELLED HARVESTING MACHINE

BACKGROUND

1. Field of the Invention

The invention generally relates to a self-propelled harvesting machine.

2. Related Technology

Forage harvesters are harvesting machines that, during harvesting operations, pick up and chop crop material standing or lying in a field and discharge it into a transport vehicle. The transport vehicle drives adjacent to or behind the forage harvester. Although it has already been suggested to saddle mount the transport container on the forage harvester, or to attach a transport trailer to a trailer coupling of the forage harvester, in practice, self-propelled transport vehicles that drive independent of the forage harvester have become common. This makes it possible with fodder material to construct a transport chain from the field to the silo with a plurality of transport vehicles.

When transferring the crop material, the driver of the transport vehicle drives adjacent to or, especially when entering the field, behind the forage harvester. In order to avoid losses from crop material that falls onto the ground instead of reaching the transport container, both vehicles must drive at approximately the same speed. For synchronization, it has been suggested to provide a wireless communication connection with which the movement of the transport vehicle is controlled by the forage harvester or vice versa. Such systems have not in the past become common in practice due to their complexity. Currently, therefore, the driver of the forage harvester equipped with a hydraulic propulsion system specifies a propulsion speed that the driver of the transport vehicle is to maintain.

The speed, in revolutions per minute (RPM), of the internal combustion engine of the forage harvester, is generally constant during harvesting operations, but can be varied by the operator within certain limits. Fuel consumption is unnecessarily high when the internal combustion engine is operated at higher RPM but is only slightly loaded with low throughputs. On the other hand, at lower RPM there is the risk that the internal combustion engine will stall or that the crop material will back up in the discharge channel when higher through-puts are processed.

It has also been suggested to specify the RPM of the internal combustion engine as a function of the width of the crop material attachment and the length of the discharge chute of the forage harvester in order to reduce fuel consumption when the forage harvester has less of a load. Although the RPM of the combustion engine is matched to the throughput, this matching is relatively imprecise and is only a function of the expected through-put, not the actual through-put.

Furthermore, it has been suggested to set the propulsion speed of the forage harvester as a function of the through-put. The RPM of the internal combustion engine remains constant. Although this means the internal combustion engine of the forage harvester can be loaded optimally, the propulsion speed will change at varying densities, which will make it difficult or impossible for the driver of the transport vehicle to drive in synch adjacent to the forage harvester.

In combine harvesters, the RPM of the internal combustion engine is also generally constant during harvesting operations. The thresher and separating devices are driven via gears with a variable transmission ratio, such as with variator drives or planetary gears in which one element is driven by the internal combustion engine and one element is driven hydraulically for RPM variation and one acts as output drive. It has also been suggested to adjust the RPM of the internal combustion engine in order to attain the desired RPM of the threshing and separating rotor. In this case, as well, the RPM of the internal combustion engine depends on the crop material through-put and fuel consumption is therefore not always optimal.

In combine harvesters, the propulsion speed in the prior art is also either specified by the operator or automatically regulated using the through-put. In such an arrangement, in order to facilitate the transfer of the harvested grain from the grain tank of the combine harvester to a transport vehicle, with an activated unloading conveyor it is known to perform the changes in the propulsion speed with a smaller amplification factor. Although this means that the speed does not vary as greatly, it is not constant. In addition, the load on the combine harvester is then not necessarily optimum.

In combine harvesters it has also bee suggested to detect the torque that the internal combustion engine outputs to the driven elements. If the measured torque is lower than a certain threshold value, which indicates that for lower through-puts, for instance in harvesting special crops or non-rectangular blocks, less power is taken off than the internal combustion engine can output at its RPM, the RPM of the internal combustion engine is reduced. A gear transmission between the internal combustion engine and the driven elements, such as the threshing drum, keeps the RPM of the driven elements constant despite the change in RPM in the internal combustion engine. This measurement is relatively imprecise, since it is based on only a portion of the through-put, while the power taken off from the propulsion system is included in the measurement value.

SUMMARY OF THE INVENTION

The problems discussed above are addressed by the teachings of the present invention.

As taught by one aspect of the present invention, the harvesting machine includes an internal combustion engine, a propulsion system that can be operated to cause the harvesting machine to move across a field with a propulsion speed, a crop material pick-up device for picking up crop material from a field, a crop material processing device for processing the crop material that has been picked up, a control unit for specifying the speed of the internal combustion engine, and a through-put measurement device for determining the through-put of the harvesting machine. It is thus taught by the present invention to control the RPM or the speed of the internal combustion engine of the harvesting machine, which is for example a self-propelled combine harvester or forage harvester, automatically depending on a measured through-put of the harvesting machine. In this manner, the RPM of the internal combustion engine is automatically adjusted to the current load so that fuel consumption is minimized and the noise level is reduced.

The propulsion speed of the harvesting machine preferably remains constant during harvesting operations. It can be specified by the operator of the harvesting machine. Thus, the transfer of the processed crop material to a transport vehicle that drives adjacent to or behind the harvesting machine is made easier. Alternatively or in addition, however, remote control of the transport vehicle would also be conceivable, which would permit the latter to drive in synch adjacent to or behind the harvesting machine.

The function of the crop material processing device and also the crop material pick-up device (if any) of the harvesting machine, depending on type and embodiment, depends to a greater or lesser extent on its operating speed. it is conceivable that the variations in the RPM of the internal combustion engine that occur during operation are not so great that they have a negative effect on the function of the crop material processing device and the crop material pick-up device. In this case it is not necessary to have a gear transmission that is between the internal combustion engine and the crop material processing device and also the crop material pick-up device (if any), with which the RPM of the latter are maintained independent of the RPM of the Combustion engine. In all other cases, such a gear transmission makes sense, however. In one embodiment, it is a planetary gear transmission that includes an element driven mechanically by the internal combustion engine, an element driven by separate power with variable RPM. and an element that is drive connected to the crop material processing device and also with the crop material pick-up device, if any.

One potential problem, in particular for relatively low through-puts that lead to reduced RPM of the internal combustion engine, lies in potential relatively short-term increases in the through-put quantities, which can lead to the internal combustion engine dying due to a lack of power reserves. Then it is not only the internal combustion engine that dies, but the crop material also often becomes blocked up inside the harvesting machine, and eliminating this blockage is a very complicated process. Thus, it makes sense to determine the throughput as early as possible in order to make it possible for the control unit to increase the RPM of the internal combustion engine, if necessary, in time.

A forward-looking through-put measurement device therefore preferably cooperates with the crop material to be picked up, upstream of the crop material pick-up device. In another embodiment, the through-put measurement device can also be integrated into the crop material attachment and, for instance, include the vertical deflection of a cross-auger of a pick-up or of a grain tool that is determined by the quantity of crop material. The time available for accelerating the internal combustion engine, in particular for small cutting lengths, is relatively short, however.

One suitable through-put measurement device upstream of the crop material pick-up device that cooperates with crop material is an image processing device with one camera or two cameras in order to record a two-or three-dimensional image of the field in front of the harvesting machine. Using the recorded image, the image processing system determines the contours of the crop material and, from this, its volume. Using the color of the crop material, the image processing system can more precisely estimate the mass of the crop material to be expected. One suitable image processing system, which can also be used for automatic steering of the harvesting machine, is described in DE 103 51 861 A and the references cited therein, the content of which is incorporated by reference herein.

Another suitable through-put measurement device is an ultrasound sensor that can be attached to the front of the crop material pick-up device. The amplitude and transit time of the received reflecting signal depends on the contours and density of the crop material. Also conceivable is the use of a scanning laser sensor that successively scans the region in front of the harvesting machine. It makes it possible to detect the contours of the crop material and to determine the quantity of crop material therefrom. Such laser sensors are described in DE 197 26 917 A and DE 101 30 665 A, the content of which is incorporated by reference herein.

DESCRIPTION OF THE DRAWINGS

The above, as well as other advantages of the present invention, will become readily apparent to those skilled in the art from the following detailed description of the embodiments when considered in the light of the accompanying drawings in which:

FIG. 2 is a schematic view of the drive system of the harvesting machine and the crop material pick-up device.

DESCRIPTION OF THE EMBODIMENTS

Figure 1:
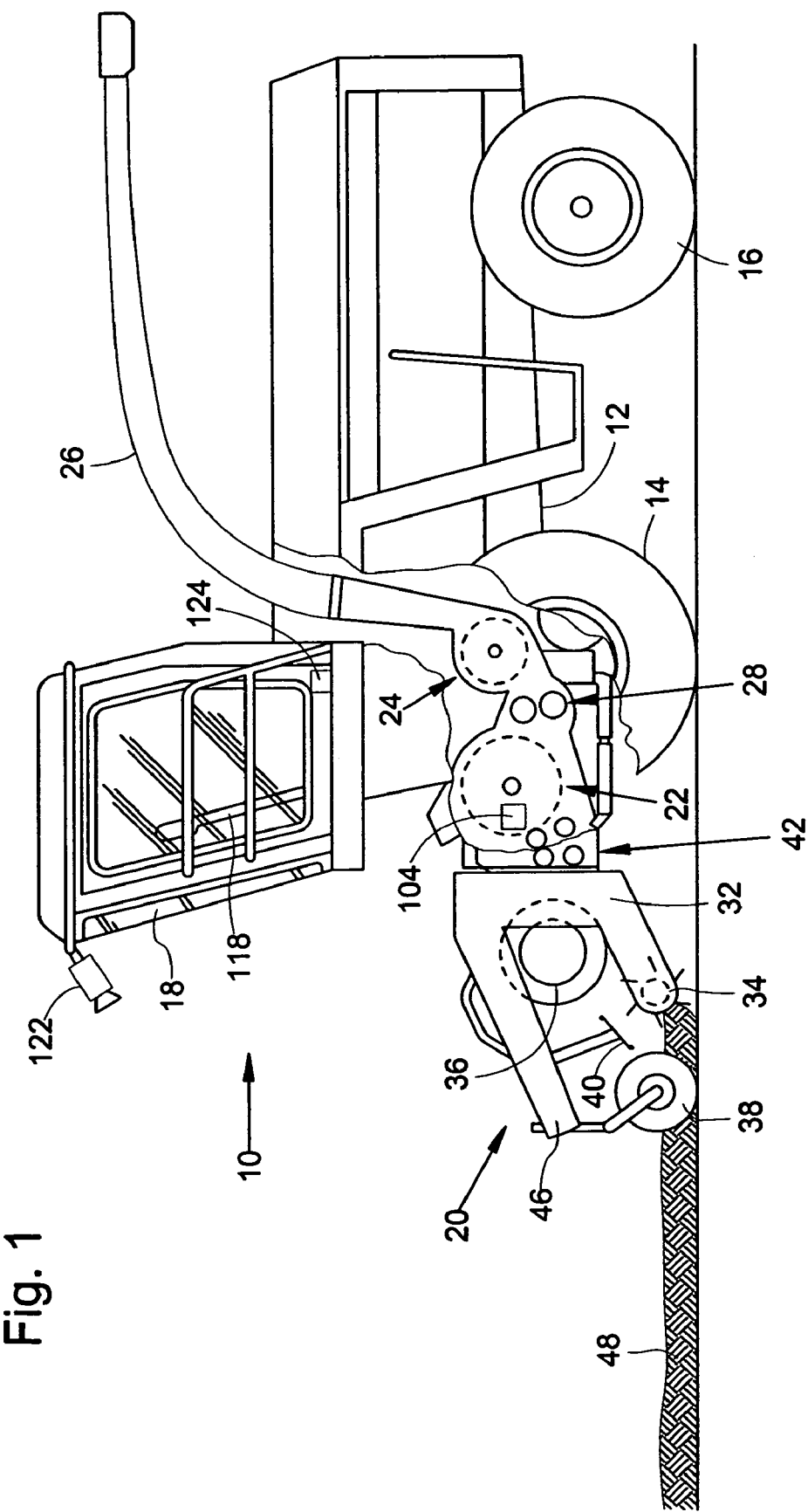
FIG. 1 is a schematic depiction of a harvesting machine with a crop material pick-up device in a side view.

FIG. 1 depicts a type of harvesting machine 10 that is a self-propelled forage harvester. The harvesting machine 10 is constructed on a frame 12 that is carried by front-driven wheels 14 and steerable rear wheels 16. The harvesting machine 10 is operated from a driver's cab 18 from which it is possible to see a crop material pick-up device 20. Material picked up from the ground by means of the crop material pick-up device 20, e.g. grass or the like, is fed via a feed conveyor 42 with feed rollers, which are arranged inside a feed housing on the front side of the forage harvester 10, of a crop material processing device 22 in the form of a chopping drum that chops it into small pieces and outputs it to a conveyor apparatus 24. The material leaves the harvesting machine 10 to an adjacent driving trailer via a discharge chute 26 that is rotatable about an approximately vertical axis and the inclination of which can be adjusted about a horizontal axis. Between the crop material processing device 22 and the conveyor apparatus 24 extends an kernel-conditioning apparatus 28 through which the material to be conveyed is fed tangentially to the conveyor apparatus 24.

The crop material pick-up device 20 is embodied as a so-called pick-up. The crop material pick-up device 20 is constructed on a mount 32 and is supported above the ground via bilaterally affixed support wheels 38, each of which is attached to the mount 32 via a carrier 46. The object of the crop material pick-up device 20 is to pick up crop material deposited in a swath 48 on the ground in a field and feed it to the harvesting machine 10 for further processing. For this, the crop material pick-up device 20 is moved over the field during the harvesting operation at a slight distance from the ground, while for transport on a street or path it is raised. Belonging to the crop material pick-up device 20 is a discharge conveyor 36 in the form of a conveyor worm that conveys the picked-up material from the sides of the crop material pick-up device 20 to a discharge opening (not shown) placed in the center, behind which the feed conveyor 42 follows. The crop material pick-up device 20, like the discharge conveyor 36, also has a rotationally driven pick-up conveyor 34 that is arranged below the discharge conveyor 36 and the prongs of which lift the material from the ground in order to transfer it to the discharge conveyor 36. In addition, a hold-down unit 40 in the form of a plate arranged above the pick-up conveyor 34 is attached to the mount 32.

FIG. 2 illustrates the drive train of the harvesting machine 10 and the harvest material pickup device 20. An internal combustion engine 50, generally a diesel engine, attached to the frame 12 of the harvesting machine 10 drives a sun wheel 54 of a planetary gear transmission 56 via a shaft 52. An annular wheel 58 of the planetary gear transmission 56 is connected to a hydraulic motor 6O. A planet carrier 62 of the planetary gear transmission is drive connected via a hollow shaft 64, through which the shaft 52 extends, to a toothed wheel 66 that engages with another toothed wheel 68.

Via a shaft 70, a bevel gearing 72, and a pulley 74, the toothed wheel 68 drives a belt 76 that cooperates with a pulley 78 that drives the conveyor apparatus 24 and with a pulley 80 that drives the crop material processing device 22. The crop material processing device 22 itself drives a shaft 82 that is the input shaft of a cut length gear transmission 84.

The cut length gear transmission 84 contains drive elements for driving lower pre-press rollers 86, 88 and upper pre-press rollers of the feed conveyor 42. The cut length gear transmission 84 can change the speed of the pre-press rollers 86, 88 in stages or continuously.

The cut length gear transmission 84 also transfers the torque mechanically from the crop material processing device 22 to a shaft end 90, whereby continuous or staged transmission is possible. A cardan shaft 92 with a fixed or variable length is detachably attached to the shaft end 90. The cardan shaft 92 extends from the shaft end 90 of the cut length gear transmission 84 to a shaft end 94 on the crop material pick-up device 20. The shaft end 94 drives a sprocket 96 that is drive connected to a sprocket 100 via a chain 98. The sprocket 100 drives the pick-up conveyor 34. In addition, the chain 98 drives the discharge conveyor 36 via another sprocket 102.

The upper pre-press rollers of the feed conveyor 42 are upwardly movable against spring energy. Their position is therefore a measure for the through-put of the harvesting machine 10. Allocated to them is a through-put measurement device that detects their vertical position and is provided with the reference label 104. Any other suitable through-put measurement device 104 can be used instead of this exemplary embodiment. In particular, reference is made to the camera 122 and the image processing system 124 that are explained in greater detail in the following. The output signal of the through-put measurement system 104 is forwarded to a control unit 106 that is connected to an engine management unit 108 of the internal combustion engine 50 and to an actor 110 for adjusting the position of a swash plate of the hydraulic motor 60. The hydraulic motor 60 is supplied a hydraulic fluid that is under pressure via a pump 112 that is driven by the internal combustion engine 50. The RPM of the hydraulic motor 60 can be adjusted by changing the position of the swash plate with the actor 110. The control unit is also connected to a RPM sensor 114 for detecting the RPM of the hydraulic motor 60, while the motor control unit 108 is connected to an RPM sensor 116 for detecting the RPM of the internal combustion engine 50.

During normal cutting operations, the control unit 106 first causes the engine management unit 108 to let the internal combustion engine 50 run at is nominal speed or at a different suitable speed, e.g. idling speed or a speed between idling speed and nominal speed, the hydraulic motor 60 is not running at first. The crop material processing device 22, conveyor apparatus 24, feed conveyor 42, and the driven elements of the crop material pick-up device 20 are driven at their target speed, the speed of the feed conveyor 42 can be varied by the cut length gear transmission 84, and thus at a given speed of the crop material processing device 22 the cut length can be varied. Preferably, a planetary gear transmission with a separate power-actuated motor is used, as described in DE 198 12 500 A.

Via a lever 118, to which a position sensor 120 is allocated, the control unit 106 receives information about the desired propulsion speed. It controls the swash plates of hydraulic motors (not shown) for driving the wheels 14, 16 such that they move the harvesting machine 10 in the forward direction over a field constantly at the speed specified by the operator. The pump for driving the hydraulic motors of the propulsion system is driven by the internal combustion engine 50; it could also be the same as the pump 112. During street travel, the RPM of the internal combustion engine 50 can be reduced relative to the nominal speed and can be fixed or variable corresponding to the current load.

After picking up the crop material, the control unit 106 receives a signal from the through-put measurement device 104 that contains information about current through-put. The smaller the through-put is, the smaller the target value for the speed of the internal combustion engine 50 that is sent by the control unit 106 to the engine management unit 108. The nominal speed of the internal combustion engine 50 is attained when the through-put is approximately equal to the maximum possible through-put of the harvesting machine. If there is no through-put at all, the control unit 106 instructs the engine management unit 108 to gradually change to idling speed. At through-puts that are between these extreme values, the control unit 106 selects the RPM that is best in terms of fuel consumption, which correspond to the power that must be provided at the given through-put, and forwards this information to the engine management unit 108. In this manner a fuel-saving operating mode is attained for the internal combustion engine 50. The information about current propulsion speed, which is provided by the position sensor 120, and preferably also via a slope or from a power demand derived therefrom for propelling the harvesting machine 10, is taken into account by the control unit 106.

In order to keep the RPM of the crop material processing device 22, the conveyor apparatus 24, the feed conveyor 42, and the driven elements of the crop material pick-up device 20 at least nearly constant, the control unit 106 receives, from the engine management unit 108, information about the RPM of the internal combustion engine 50. This information is based on the signal of the RPM sensor 116. The information about the RPM of the internal combustion engine 50 can also be based on the target value that the control unit 106 transmitted to the engine management unit 108.

Depending on the RPM of the internal combustion engine 50, the control unit 106 triggers the actor 110 so that the output RPM of the planetary gear transmission 56 on the hollow shaft 64 remain constant and independent of the RPM of the internal combustion engine 50. Minor fluctuations are not important, since the cut length remains constant due to the drive of the crop material processing device 2 and the feed conveyor 42, derived together from the output drive of the planetary gear transmission 56, and are therefore not taken into account by the control unit 106 for avoiding unnecessary displacement movement of the actor 110. However, the described regulation does not prevent the conveying action of the crop material processing device 22 or the conveyor apparatus 24 from being limited at lower RPM of the internal combustion engine 50.

In addition to the through-put device 104, attached to the front of the driver's cab 18 is an electronic camera 122 that records continuous images of the field in front of the harvesting machine 10. The signal from the camera 122 is forwarded to a through-put measurement device 124 in the form of an image processing system that during operation differentiates the swath 48 from the ground and calculates the volume of the section of the swath 48 to be picked up next and the through-put. The through-put signal from the through-put measurement device 124 is forwarded to the control unit 106. It compares the signals from the through-put measurement device 104 and the through-put measurement device 124, taking into account the time delay between the times at which each of these cooperates with the crop material, and calibrates therewith the output signal of the through-put measurement device 124. If the output signal of the through-put measurement device 124 indicates to the control unit 106 an increase in the expected through-put, the latter promptly accelerates the internal combustion engine 50 using corresponding signals to the engine management unit 108. This prevents the RPM from dropping too far, and possibly causing the internal combustion engine 50 to die. It would also be possible to do without the through-put measurement device 104 and to use only the camera 122 and the through-put measurement device 124 for determining the through-put.

In accordance with the provisions of the patent statutes, the present invention has been described in what is considered to represent its preferred embodiment. However, it should be noted that the invention can be practiced otherwise than as specifically illustrated and described.

What is claimed is:

1. A self-propelled harvesting machine comprising:
  an internal combustion engine;
  a propulsion system that can be operated to cause said harvesting machine to move across a field with a propulsion speed;
  a crop material pick-up device for picking up crop material from a field;
  a crop material processing device for processing the crop material that has been picked up;
  a control unit configured to specify the speed of said internal combustion engine;
  a through-put measurement device for determining the through-put of said harvesting machine, wherein said control unit is configured to vary an operating speed of said internal combustion engine depending on the signal from said through-put measurement device; and
  a gear transmission with a variable gear ratio being coupled between said internal combustion engine and one of said crop material processing device and said crop material pick-up device, through which the speed of said one of said crop material processing device and said crop material pick-up device can be kept approximately constant and thus independent of the operating speed of said internal combustion engine.

2. The self-propelled harvesting machine in accordance with claim 1, wherein the propulsion speed is adjustable and is independent of the measured through-put.

3. The self-propelled harvesting machine in accordance with claim 1, further including a transfer device for transferring the crop material processed by said crop material processing device to a transport vehicle.

4. The self-propelled harvesting machine in accordance with claim 1, wherein said gear transmission includes a planetary gear transmission in which one element is driven by said internal combustion engine and one element is driven by a separate power source and acts as an output drive.

5. The self-propelled harvesting machine in accordance with claim 1, wherein said control unit can be operated to specify the operating speed of said internal combustion engine that are most favorable in terms of fuel consumption and that correspond to the power to be applied at a given through-put.

6. The self-propelled harvesting machine in accordance with claim 1, wherein said through-put measurement device works in a forward-looking manner such that when the through-put increases said control unit increases the operating speed of said internal combustion engine before said internal combustion engine stalls.

7. The self-propelled harvesting machine in accordance with claim 6, wherein said through-put measurement device cooperates with said crop material upstream of said crop material pick-up device.

8. The self-propelled harvesting machine in accordance with claim 6, wherein said through-put measurement device includes a camera and an image processing system that determines an expected through-put quantity using an image signal recorded by said camera.

9. The self-propelled harvesting machine in accordance with claim 6, wherein said through-put measurement device includes a laser sensor or ultrasound sensor that scans the crop material in front of said harvesting machine and is based on amplitude and/or transit time measurement.

* * * * *